Patented Mar. 25, 1947

2,417,995

UNITED STATES PATENT OFFICE 2,417,995

ACETYLATION OF LIGNOCELLULOSIC BOARD MATERIALS

Alfred J. Stamm and Harold Tarkow, Madison, Wis., assignors to United States of America, as represented by the Secretary of Agriculture No Drawing. Application November 14, 1944, Serial No. 563,418

9 Claims. (Cl. 117—118)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to treated wood or other treated lignocellulosic board materials, that is, materials containing naturally occurring chemically combined cellulose and lignin, and has among its objects reducing the hygroscopicity and consequently the equilibrium swelling and shrinking, which is the change in volume due to changes in moisture content, and thus reducing the accompanying degradation of the material in the form of checking, splitting, and warping.

According to the invention, this is accomplished by replacing the available polar hydroxyl groups of the cellulose and the lignin with less hygroscopic acetate groups without breaking down the structure of the wood or impairing its strength properties. In the process used, the wood is dimensionally stabilized in such a manner to avoid embrittlement, whereby it can be readily compressed under heat and pressure to a densified product with high dimensional stability, finish, and improved strength properties.

Acetylation of native and isolated cellulose fiber, of isolated lignin and of wood sawdust or chips is known. However, the known acetylation methods comprise the use of mineral acids, such as sulphuric or phosphoric acid, together with acetic anhydride. These methods tend to break down the natural bonds between the constituents of the material, such as the cellulose-lignin and cellulose-hemicellulose bonds, hydrolyze the hemicelluloses, and defibrillate the cellulose with a resultant breakdown in the physical structure of the wood.

In general, according to this invention, the lignocellulosic board material is dried until its moisture content has been reduced to 6% or less, preferably about 2%, and then impregnated with a moisture-free acetylating medium containing acetic anhydride, free from acetic acid, either alone, or mixed with other components, such as a tertiary amine and acetone. This impregnation is carried out within a temperature range sufficiently high to acetylate the board material, but not so high as to cause its degradation. A temperature range of about 130° F. to 230° F. is suitable for this purpose, depending somewhat on other variable factors as will later be explained.

After the acetylation is complete, the material is dried, at a temperature sufficient to avoid undue drying strains, for the purpose of removing the residual acetylating medium and reaction products, and until such time as to substantially remove chemical odors.

The impregnation of the material with the aforementioned acetylating medium, is accomplished by either of two processes, namely, when the acetylating medium is liquid or when it is vapor. The former process will be considered first:

Dry veneer, or thin board material, after having its moisture content reduced to 6% or less, preferably about 2%, can be thoroughly impregnated and sufficiently acetylated, that is, until the weight of the dry wood has been increased about from 15% to 25%, after removal of the excess chemicals, with substantially acetic-acid-free liquid acetic anhydride alone as the acetylating medium.

In this process, the wood is impregnated with acetic anhydride, substantially free of acetic acid, by immersing it in the acetic anhydride contained in a tank inside of a pressure-treating cylinder, followed by the application of air pressure. The pressure required will depend upon the species and thickness of the wood. A pressure of about 15 to 25 pounds per square inch is adequate for $\frac{1}{16}$-inch thick spruce or cottonwood veneer, whereas a pressure of about 50 to 100 pounds per square inch should be used for $\frac{1}{16}$-inch thick birch or maple veneer.

When acetic anhydride alone is used, the temperature of the treating cylinder is preferably maintained about from 165° to 220° F. for a period up to about 16 hours. Under these conditions, sufficient acetylation of $\frac{1}{16}$-inch thick birch veneer is obtained to give a reduction in the subsequent equilibrium swelling to about from 35% to 40% of normal. This percentage is based on 100% for swelling of the corresponding untreated species. More readily impregnated board material requires less time.

The board material can be more rapidly and completely acetylated without breakdown of the wood structure by using, as the acetylating medium, about from 5% to 50%, by volume, of a water-free tertiary amine, preferably an aromatic amine, such as pyridine or quinoline, together with the substantially acetic acid-free acetic anhydride. The tertiary amine acts as an added swelling agent to open up the structure and consequently, aids diffusion into the structure. It also serves as a catalyst in aiding acetylation, presumably, by neutralizing any acetic acid that is formed. Only tertiary amines should be used, since the primary and secondary amines will react with the acetic anhydride.

The following example illustrates the effect of the use of the tertiary amine. When birch veneer is treated with substantially acetic acid-free acetic anhydride at 140° F. for 16 hours, a product is obtained with an equilibrium swelling of 76% of normal. If the veneer is acetylated by using as an acetylating medium about 5% to 40% by volume of pyridine, together with substantially acetic acid-free acetic anhydride, a product is obtained with an equilibrium swelling of 46% to 41% of normal.

When the acetylating medium contains acetic anhydride and a tertiary amine, the acetylating temperature may range about from 150° to 220° F. to give a product with low equilibrium swellings in water. In all cases, it is desirable to use temperatures below the boiling point of the acetylating medium under the pressure conditions employed.

The addition of as little as 5%, by volume, of pyridine to the substantially acetic-acid-free acetic anhydride treating solution greatly increases the ease of acetylation without breakdown of the wood structure, but the addition of more than 50% reduces the ease of acetylation. It is therefore recommended that the acetylation be conducted at concentrations of pyridine, or other tertiary amine, not exceeding 50%.

It has been found further, that substantially acetic-acid-free acetic anhydride and the water-free tertiary amine can be dissolved in water-free acetone, and still remain equally effective as the acetylating medium. The advantages of using such a solvent are the economy of chemicals, the use of an acetylating medium that has less tendency to corrode the equipment, and an increased volatility, insuring greater ease in subsequent removal of the excess chemicals. The proportion of acetone used in the acetylating medium may be varied over a wide range.

To illustrate the effects of the use of acetone, a solution containing 10%, by volume, of substantially acetic-acid-free acetic anhydride, 8%, by volume, of water-free pyridine, and 82% by volume, of acetone, is a suitable acetylating medium, and when used at temperatures as low as about 120° F., equilibrium swelling 50% of normal has been obtained. At higher temperatures, much lower values result. It is, therefore, preferred that the combined acetic anhydride, tertiary amine and acetone be used as the acetylating medium and the acetylating temperature range be about from 130° F. to 200° F.

Other liquid impregnation methods, such as merely soaking the board material in the acetylating medium, or immersing the hot material in a cooled medium, so that cooling of the material in the medium causes a contraction of the contained air and a subsequent sucking in of the medium, or pulling a vacuum prior to applying air pressure, can also be used. However, these methods require longer times for adequate treatment than with the pressure method. Whichever impregnating medium be used, the acetylating medium should be adequately protected from moisture contamination. The acetylation is then performed by the application of heat to these impregnated materials.

When the treatment of the board material is complete, the treating cylinder is cooled, opened, and the material drained. The acetylated product is then kiln dried, in the case of veneer for about 16 hours at about 180° F., followed by drying for about 2 to 4 hours at about 200° to 212° F., or until the odors from the material of any acetic acid formed, and of the tertiary amine and acetic anhydride, are reduced to a desired minimum. When acetone is used as the solvent, either the drying temperature, drying time, or both, may be reduced because of the greater volatility of the acetylating medium.

Since the drying is merely to remove residual acetic anhydride, the tertiary amine and the solvent, if present, as well as the acetic acid formed by the reaction, the only limitation on the drying temperature is that it be controlled to prevent the creation of drying stresses or chemical degradation so that no breakdown of the board material will occur. These temperatures can be varied over considerable limits. Higher temperatures and shorter times can be used for the less refractory woods, that is, woods that do not tend to check and honeycomb on drying, for the thinner veneers, and for quite porous board materials. The drying can be done in a kiln, or continuous drier that is constructed of materials that will withstand the action of the volatilized treating chemicals and products. The drying temperatures can, in general, be raised and drying times reduced as a result of better circulation.

The following examples describe specific ways in which the liquid acetylation may be carried out:

Example I

Dry birch veneer, at a moisture content not exceeding 6%, and preferably at a moisture content of about 2%, is immersed in a chemical-resistant tank containing substantially acetic-acid-free acetic anhydride alone as the acetylating medium, care being taken that each ply is wetted by the acetic anhydride as it is immersed. The veneer is then weighed down and covered with sufficient acetic anhydride so that upon impregnation the wood still remains immersed. The tank is then placed into a chemical-resistant, pressure-treating cylinder which is then sealed, and an air pressure of 75 pounds per square inch is applied. The temperature is maintained at about 185° F. about from 8 to 16 hours. At the end of this time, the system is permitted to cool, the treating cylinder is opened, the treated veneer is drained and is removed. After removal it is stickered, that is, spaced with sticks between the individual plies, and is then dried in a kiln with air circulation but without humidification, for about 16 hours at about 180° F. At the end of this time, the temperature is raised to about 212° F. and so maintained for about 3 hours.

Example II

The same procedure of Example I is followed, except that the acetylating medium contains 15%, by volume, of water-free pyridine, and 85%, by volume, of substantially acetic-acid-free acetic anhydride, and the acetylating temperature is reduced to about 160° F.

Example III

The same procedure of Example I is followed, except that the acetylating medium contains 8%, by volume, of water-free pyridine, 10%, by volume, of substantially acetic acid-free acetic anhydride, and 82%, by volume, of acetone, and the acetylating temperature is reduced to about 140° F.

The acetylation of wood, or other lignocellulosic board materials, by impregnation with the vapors of the aforementioned moisture-free-acetylating medium, will now be described:

This acetylation can be carried out to best advantage in an air-tight, chemically-resistant kiln, equipped with adequate steam coils capable of raising the temperature to about 230° F., a vapor-circulating fan, air intake and exhaust ducts that can be tightly closed, a vapor condenser connected to the exhaust duct, and a shallow pan mounted over steam coils on the floor of the kiln, and equipped with a valve that can be used for filling the pan with liquid, or completely draining the pan without opening the kiln. The arrangement of the steam coils in the kiln should be such as to give quite uniform temperature throughout the kiln, but with a slight excess of heat input under the floor pan to compensate for heat losses due to evaporation. It is desirable to have the liquid in the pan very slightly warmer than the kiln as a whole. Appreciable temperature changes, however, will cause excessive condensation in the wood, and nullify the advantages of this vapor-phase acetylation over liquid-phase acetylation. A humidification system is needed in the kiln only when sizeable green boards, or refractory species of green veneer (species subject to checking and honeycombing on drying) are to be treated. In these cases, it would be used only in the predrying steps prior to acetylation.

Flat- or edge-piled boards, with stickers or spacers between each piece to allow for adequate circulation, are placed in the kiln above the floor pan. The boards are then dried either with or without humidification, as dictated by the original moisture content, size, and refractiveness of the material, at normal kiln drying temperatures, degree of circulation, and exhaust, to a moisture content of preferably about 2%.

The intake and exhaust ducts are then closed and an acetylating liquid, consisting of substantially acetic-acid-free acetic anhydride alone, is run into the shallow floor pan. The temperature is adjusted to a value of between 175° F. to 230° F. and held for a period from about 8 to 16 hours, heating at the higher temperatures for the shorter times, with good circulation within the kiln, giving an acetylation corresponding to a weight increase of the dry wood about from 15% to 25%. The acetylating liquid is then drained from the floor pan, and the intake and exhaust ducts are opened. The board material is then dried under circulating and exhaust conditions for about 8 hours at a temperature of about 180° F., followed by 3 hours at 212° F., which is sufficient to reduce the residual odor of the treating constituents and the acetic acid formed to a desired minimum. During this drying step the exhaust duct condenser is cooled to condense the exhaust vapors.

When acetic anhydride vapor alone is used for the treating, the temperature of the kiln should be maintained at about from 175° F. to 230° F. for about 16 hours to obtain sufficient acetylation of $\frac{1}{16}$-inch thick birch veneer, in order to give equilibrium swellings of about 35% to 40% of normal.

In the vapor-phase acetylation, as in the case of the liquid-phase acetylation, the acetylating medium may contain about from 5% to 50% of a tertiary amine in addition to the acetic acid-free acetic anhydride with the corresponding results.

To illustrate the effect of the use of the tertiary amine when 15%, by volume, of pyridine is added to the acetic anhydride, sufficient acetylation occurs at about 150° F. with $\frac{1}{16}$-inch birch veneer in about 16 hours to give a final product with an equilibrium swelling of 30% of normal. When the acetylation is carried out at about 175° F., an equilibrium swelling of 25% of normal is obtained. When 25%, by volume, of pyridine is used, the aforementioned equilibrium swellings are obtained by treating at about 140° F. and 160° F., respectively.

Also, the acetylating medium may contain acetone in addition to the tertiary amine and acetic anhydride. Good vapor acetylation and low equilibrium swellings have been obtained by using 45%, by volume, of water-free acetone, 40%, by volume, of acetic acid-free acetic anhydride, and 15%, by volume, of water-free pyridine. The same advantages of using acetone as a solvent are present as exist in the liquid-phase acetylation, with the additional advantage that the vapors of the solvent aid in swelling and opening the structure of the board material.

The drying process used in the vapor-phase acetylation serves the same purpose, operates on the same various types of board materials as described relative to the liquid-phase acetylation, and is subject to the same limitations of temperature, namely, to avoid placing undue drying stresses on the material, so as to prevent degradation of the structure.

The following examples describe specific ways in which the vapor acetylation may be carried out:

Example IV

Dry birch veneer, at any moisture content, is stacked on edge in a suitable rack with spacers to hold the individual plies apart. The loaded rack is then run into a chemically-resistant, airtight kiln, as previously described, and the load placed over the shallow floor pan. The veneer is then dried to about 2% moisture content, with temperature, humidity, circulation, and exhaust adjusted to give optimum drying without degrading the wood. The air intake and exhaust ducts are then closed, and substantially acetic acid-free acetic anhydride alone is run into the floor pan. The kiln temperature is then adjusted to a temperature of about from 175° F. to 230° F. and the air circulated within the kiln and through the kiln load so that the vapors of the acetic anhydride are carried to all surfaces. This vapor treatment is continued about from 8 to 16 hours, or until the wood has gained about from 15% to 25% in weight on a dry-weight basis after removing the excess of chemicals. The liquid is then drained from the floor pan and the intake and exhaust ducts opened, following which the veneer is dried without humidification, at a temperature of about 180° F. for about 8 hours. At the end of this time, the temperature is raised to about 212° F. for about 2 to 4 hours, or until the odor of the acetylating constituents and the acetic acid formed are reduced to a desired minimum, in the meantime condensing the exhaust vapors in the condenser connected to the exhaust duct.

Example V

The same procedure of Example IV is followed, except that the acetylating medium contains 15%, by volume, of water-free pyridine, and 85%, by volume, of substantially acetic acid-free acetic anhydride, and the acetylating temperature is reduced to about 160° F.

Example VI

The same procedure of Example IV is followed, except that the acetylating medium contains 40%, by volume, of substantially acetic acid-free acetic anhydride, 15%, by volume, of water-free pyridine, and 45%, by volume, of water-free acetone and the acetylating temperature is within the range about from 160° F. to 180° F.

In the foregoing examples illustrating both the liquid-phase and vapor-phase acetylation, birch veneer was used as the wood sample. However, other species of veneer, thicker wooden boards of readily treated species in short lengths, and other porous lignocellulosic composition board materials, can be substituted for the birch veneer with appropriate adjustments in the predrying (in the case of vapor acetylation), acetylation, and final drying times.

Also, the material can be stickered in a flat-piled horizontal manner, rather than being edge piled.

In both the liquid and vapor acetylation the presence of appreciable amounts of moisture in the board material, and in the acetylating medium, is highly undesirable. Not only is excessive anhydride converted to acetic acid, but a breakdown of the structure occurs as a result of hydrolysis. In the liquid acetylation, therefore, the moisture content of the wood should not exceed 6%, and should preferably be about 2%. In the vapor acetylation, however, it is recommended that the moisture content be as low as 2%. In the acetylating medium, the acetic anhydride should be substantially free from acetic acid, and the tertiary amine and acetone should be free from water.

Also, in both the liquid and vapor acetylation, the limitations in the size and species of the board materials, which can be adequately treated by our methods, are controlled by the limitations in the obtainable degree of impregnation. Veneer of practically any species in thicknesses up to ⅛ inch can be impregnated in a reasonable length of time. Thick wood boards can be thoroughly treated in the case of readily impregnated species in lengths of a foot or less. Porous lignocellulosic composition boards can be treated in larger sizes and greater thicknesses. As the treating time is largely the time necessary to obtain adequate impregnation rather than the actual time for acetylation to take place, the treating time will increase with the increase of resistance of the material to impregnation.

Veneer treated according to our invention has not been structurally damaged. The mechanical properties are slightly improved. The improvement is in proportion to the increase in specific gravity; that is, the specific strength properties of the treated specimen are the same as those for the control. The toughness of the treated material is slightly greater than that of the control. The treated veneer can be glued with hot-press phenolic glues, and can be simultaneously compressed and glued with hot-press phenolic glues to give a compressed product, similar to that of resin-treated compressed wood and having similarly increased strength properties but differing in that the toughness of the wood is not reduced.

In conclusion, some advantages of the vapor-phase acetylation over the liquid-phase acetylation may be shown as follows:

1. The chief advantage is that less excess acetylating medium, which must subsequently be removed, is taken up by the wood. For example, in acetylating Sitka spruce, 240% of the weight of the dry wood of acetylating liquid was taken up by the wood in the liquid-phase acetylation, whereas only 50% was taken up in the vapor-phase treatment. Only about 15% to 25% (average 20%) of the dry weight of the wood of acetylating medium becomes fixed. Hence, about 12 times as much acetylating medium as is needed, is taken up in the liquid-phase acetylation, whereas only 2.5 times as much as is needed is taken up in the vapor-phase acetylation. Obviously, less time is required to dry the vapor-treated veneer than is required to treat the liquid-treated veneer.

2. The liquid in the pan, during the vapor-phase acetylation, does not become discolored from extractives, as is the case for the liquid in the liquid-phase treating tank. As a result of this, the excess liquid in the vapor-phase acetylation can be re-used indefinitely, whereas the liquid from the liquid-phase acetylation has to be frequently distilled for re-use.

3. In the vapor-phase acetylation, deeper penetration can be obtained into thick specimens of wood.

4. The vapor-phase acetylation has the final advantage over the liquid-phase treatment, in that with the types of equipment available the wood does not have to be handled between the predrying, acetylating, and final drying steps.

Having thus described our invention, what is claimed is:

1. A vapor-phase process of partially acetylating lignocellulosic board materials so as to impart to said lignocellulosic materials a high degree of dimensional stability without breaking down the physical structure, comprising impregnating lignocellulosic board materials having a moisture content of about 2%, with the vapor from a substantially moisture-free liquid acetylating medium containing acetic anhydride substantially free from acetic acid, at a temperature range of about from 140° F. to 230° F. until the board material has increased in weight by about from 15 to 25 percent of the weight of the original board material due to the acetylation.

2. A process of claim 1, wherein the substantially moisture-free acetylating medium consists of vaporized acetic anhydride.

3. A process of claim 1, wherein the substantially moisture-free acetylating medium also contains a vaporized tertiary amine.

4. A process of claim 1, wherein the substantially moisture-free acetylating medium also contains a vaporized tertiary amine and vaporized acetone.

5. A vapor-phase process of partially acetylating lignocellulosic board materials so as to impart to said lignocellulosic materials a high degree of dimensional stability without breaking down the physical structure, comprising impregnating lignocellulosic board materials having a moisture content of about 2%, with the vapor from a substantially moisture-free liquid acetylating medium containing acetic anhydride substantially free from acetic acid, and about from 5% to 50%, by volume, of pyridine, at a temperature range of about from 140° F. to 175° F. until the board material has increased in weight by about from 15 to 25 percent of the weight of the original board material due to the acetylation.

6. A vapor-phase process of partially acetylating lignocellulosic board materials so as to impart to said lignocellulosic materials a high degree of dimensional stability without breaking down the physical structure, comprising impregnating lignocellulosic board materials having a moisture content of about 2%, with the vapor from a substantially moisture-free liquid acetylating medium consisting of about 40%, by volume, of acetic anhydride substantially free from acetic acid, about 15%, by volume, of water-free pyridine and about 45%, by volume, of water-free acetone, at a temperature range of about 160° F. to 180° F. until the board material has increased in weight by about from 15 to 25 percent of the weight of the original board material due to the acetylation.

7. Wood which contains acetyl groups that have replaced a large part of the free hydroxyl groups present therein without breaking down the natural bonds, or damaging the fibrous character, to give an increase in weight of about from 15% to 25% of the board material, whereby the hygroscopicity of the material is reduced with a consequent reduction in equilibrium swelling and shrinking.

8. Wood which has been partially acetylated by means of a substantially moisture-free acetylating medium containing acetic anhydride, substantially free from acetic acid, and from zero up to about 50 percent, by volume, of a tertiary amine until the wood has increased in weight by about from 15 to 25 percent of the weight of the original wood, whereby a large part of the free hydroxyl groups present in the original wood have been replaced with acetyl groups without breakdown of the natural bonds or damage to the fibers with a resulting reduction in the hygroscopicity of the wood and a consequent reduction in its equilibrium swelling and shrinking.

9. Wood which has been partially acetylated by means of a substantially moisture-free acetylating medium containing acetic anhydride, substantially free from acetic acid, and from zero up to about 50 percent, by volume, of pyridine until the wood has increased in weight by about from 15 to 25 percent of the weight of the original wood, whereby a large part of the free hydroxyl groups present in the original wood have been replaced with acetyl groups without breakdown of the natural bonds or damage to the fibers with a resulting reduction in the hygroscopicity of the wood and a consequent reduction in its equilibrium swelling and shrinking.

ALFRED J. STAMM.
HAROLD TARKOW.

REFERENCES CITED

The following references are of record in the file of this patent:

UNITED STATES PATENTS

| Number | Name | Date |
| --- | --- | --- |
| 954,310 | Lederer | Apr. 5, 1910 |
| 1,991,323 | Haller | Feb. 12, 1935 |
| 1,996,707 | Nathansohn | Apr. 2, 1935 |
| 2,036,947 | McKee | Apr. 7, 1936 |
| 2,109,295 | Lawrie et al. | Feb. 22, 1938 |

FOREIGN PATENTS

| Number | Country | Date |
| --- | --- | --- |
| 582 390 | French | Dec. 17, 1924 |